3,325,311
PREPARATION OF A BORON-DOPED SILVER
OXYGEN ELECTRODE
James R. Huff, Milwaukee, Wis., assignor to Allis-Chalmers Manufacturing Company, Milwaukee, Wis.
No Drawing. Filed May 19, 1964, Ser. No. 368,709
5 Claims. (Cl. 136—86)

This invention broadly relates to electrochemical cells, and especially to those electrochemical cells known as fuel cells. More particularly, this invention relates to new and useful electrode structures for use in fuel cells and like apparatus. In particular, this invention deals with novel electrodes having boron-doped silver incorporated in their structure, and to methods of fabricating such electrodes.

The term fuel cell, as used herein, refers to those electrochemical devices that convert the free energy of a chemical reaction directly to electrical energy. Such devices are well known in the art and although there are differeneces between various cells, a discussion of some of their common characteristics will aid in the understanding of my invention.

As is known, oxidation-reduction reactions are accompanied by the transfer of electrons from the reductant to the oxidant. In individual fuel cells, the oxidation reaction and reduction reaction take place at spacially separated electrodes. At each electrode there occurs what is called a half-cell reaction. One electrode, called the anode, is the site of the oxidation half-cell reaction. A reactant, referred to as the fuel that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte. The current produced in the external circuit can do useful work. Production of current will continue so long as fuel and oxidant are supplied and waste products exhausted.

The voltage of the individual fuel cell is limited by the theoretical free energy change ($\Delta F$) for the reaction at the fuel cell operating temperatures. The amperage of the cell is determined by the rate of reaction and the size of the cell. In practice, several individual fuel cells are coupled in cooperative electrical connection to obtain the desired output. A plurality of cells so connected is known as a module.

Although the reaction between oxidant and fuel is thermodynamically spontaneous, the respective reactants must attain an activated state before they can react. The energy input required to reach an activated state, i.e., heat of activation, partly determines the speed of reaction. The greater the energy that is required for activation, the fewer are the molecules possessing this energy at a given temperature, and the slower is the reaction.

In the past, to speed reaction, an external heat source was used to heat fuel cell reactants and thereby activate them. More recently catalysts have been employed to increase reaction rate. Through a mechanistics bypass a catalyst brings about reaction with a smaller heat of activation. Catalysts have made possible the operation of so-called low temperature fuel cells (about 25°—about 300 C.) without a lessening in cell output compared to cells operating at higher temperature. It follows that with more efficient catalysts, the activation energy can be decreased and greater cell outputs attained at a given voltage and temperature.

The catalytic activation of oxygen, air and the like has been accomplished in fuel cells by the use of catalysts such as silver. My invention concerns the improvement of the effectiveness of silver as an oxidant catalyst. I have discovered that silver catalysts can be improved through the addition of a boron promoter to the silver. A promoter is a substance that greatly increases catalytic activity, although it is present in only relatively small quantities. The novel electrode I have invented is suitable for activating any oxidant that can be activated by nonpromoted silver.

Accordingly, the general object of my invention is to provide a catalytic activated cathode for fuel cells which does not carry a platinum group metal catalyst but yet does not sacrifice the output characteristics that those catalysts attain.

A further object of my invention is to provide fuel cell cathodes that attain superior outputs compared to prior art cathodes carrying an equivalent weight of silver.

A still further object of my invention is to provide a method for incorporating boron atoms within the crystal lattice of silver thereby forming a boron-doped silver catalyst.

The novel features which are considered as characteristic for the invention are set forth in particular in the appended claims. The invention itself, however, both as to its construction and its operation, together, with additional objects and advantages will be best understood from the following description of specific embodiments.

The surprising property of boron to promote the catalytic activity of silver as a fuel cell oxidant catalyst is the inventive concept I shall now describe.

According to one practice of my invention, an electrode substrate comprising an electrically conductive material that is indifferent to any destructive chemical action of the electrolyte such as nickel or carbon is impregnated with catalytic boron-doped silver that has been previously prepared. This preparation can advantageously be accomplished by the reduction of silver ion with a reactive borohydride. The reactive borohydrides are those compounds which dissolve in water to form the ion ($BH_4^-$). More particularly, they are those borohydrides that decompose in water having a pH <7 to form gaseous hydrogen. The alkali borohydrides are especially well suited to perform the silver reduction step. Of the alkali borohydrides, the potassium and sodium compounds are the best known and are presently commercially available.

The reaction of the borohydride ion with silver ion produces a finely divided precipitate of silver metal. The precipitate includes a small, but for my purpose, a significant amount of boron.

In co-precipitation phenomena, according to present theory, if the co-precipitated material, in this instance boron, fits into the crystal lattice of the host crystal, silver, it is occluded in the form of a solid solution of mixed crystals. On the other hand, if the co-precipitated boron does not fit into the crystal lattice of the silver, it may be absorbed during the growth of the silver crystal and form a seat for imperfections in the crystal lattice of the crystalline silver precipitate.

The crystal structure of silver and the nature of the boron atom lead me to conclude that the boron is absorbed presenting imperfections within the crystal lattice of the silver. Regardless of the validity of my conclusion, I have, as shall be seen, aptly demonstrated that when silver is reduced in the presence of boron so that the boron is included within the reduced silver, a very active and extremely useful cathode catalyst for fuel cells is obtained.

The material precipitated has a composition varying from about 98% to nearly 100% silver by weight. The remainder is boron. Analytical studies have shown that the boron present in the boron-doped silver is elemental boron rather than a boron containing compound. Analysis of the dried precipitate to 100% of the sample weight reveals only silver and boron present. Furthermore, X-ray diffraction studies show only the diffraction pattern for silver, thereby excluding the possibility for the formation of a silver boride.

To produce the boron-doped silver catalytic material I first dissolve a reactive borohydride in water. I then admix this aqueous solution with a previously prepared aqueous solution of silver ion. An immediate reaction ensues with the precipitation of the boron-doped silver. The relative concentration and amounts of the borohydride and silver ion are not critical; small amounts of borohydride produce some precipitate. The use of at least one equivalent of borohydride ion per equivalent of silver ion, however, is advisable.

As stated previously, the silver content of the precipitate is in the range of 98% to about 99.7% by weight of the dry material. The boron content of the precipitate will then vary from about 0.3% to about 2% by weight of the dried boron-doped silver precipitate. To obtain maximum catalytic activity it is preferable that the silver comprise about 99% by weight of the dried boron-doped silver. Adjustment of precipitation conditions such as temperature, rate of admixing the reactants and the like have slight effect on the relative amounts of silver and boron in the precipitate. The amount of boron is, however, mainly affected by the amount of borohydride in excess of that which is theoretically necessary to reduce all the silver ion. This is because the boron-doped silver precipitate initially formed by the first increment of borohydride is an excellent decomposition catalyst for borohydride subsequently admixed. Therefore, the reaction of silver ion with borohydride is not stoichiometric and an excess of borohydride is required to completely precipitate the silver. After the complete reduction of the silver, any borohydride remaining in solution is decomposed. To compensate for the nonstoichiometry of the reduction, I have found it preferable to use a large excess of borohydride to insure complete precipitation of silver. Furthermore an excess of borohydride yields a more finely divided precipitate of boron-doped silver, which because of its high surface area is well suited as a catalyst for the cathode reaction in fuel cells.

The precipitate is given a short time to digest, usually 1 or 2 minutes being more than sufficient. Then it is filtered from the supernatant liquid, and washed with water to clear it of impurities, e.g., the borate ion. After washing, it is dried. Drying can be accelerated by spreading the precipitate on inert sheets in a 100° C. oven. The dried precipitate is now ready for combination with an electrode substrate.

In the case of a porous solid substrate, the boron-doped silver can be pressed into the pores. Alternatively a granular substrate can be admixed with the boron-doped silver. Various methods of forming an electrode of a suitable substrate and the boron-doped silver will become apparent to one skilled in the art after having been made aware of the catalytic properties of the boron-doped silver.

The invention is more particularly described and explained by means of the following examples, which are illustrative and not intended to limit its scope. In the examples all percentages are by weight unless otherwise indicated.

The following examples illustrate the method I have used to obtain a boron-doped silver catalyst.

*Example I*

A first aqueous solution of 5% silver nitrate was prepared. A second solution containing 5% sodium borohydride was also prepared. To 20 milliliters (6.2 millimoles of $AgNO_3$) of the first solution was added 2 milliliters (2.7 millimoles of $NaBH_4$) of the second solution. An immediate reaction took place resulting in a precipitate of a silver colored solid. The supernatant liquid showed some remaining, unreduced silver. The precipitate was collected by filtration, washed with water, spread onto a tray and dried at 100° C.

*Example II*

To 20 milliliters (6.2 millimoles) of the silver nitrate solution prepared in Example I was slowly added 6 milliliters (8.3 millimoles) of the borohydride solution prepared in Example I. An immediate reaction again took place, but this time resulting in a gray colored precipitate. The color difference between the precipitate of Example I and that obtained in Example II is believed only to be a function of particle size, the excess of borohydride in Example II forming a more finely divided precipitate. No silver was present in the supernatant liquid. The precipitate was collected by filtration, washed with water and then dried at 100° C.

*Example III*

An aqueous solution of 20% by weight silver nitrate was prepared. One hundred milliliters of this solution was admixed with 40 milliliters of the 5% sodium borohydride solution. The precipitate was collected and dried; and then separated into four portions. These separate portions were degassed at room temperature; 105° C.; 200° C.; and 300° C. The three samples subjected to degassing at elevated temperature were held at that temperature for three hours. Surface area measurements were then taken and the results were as follows:

| | $Meters^2/gram^{-1}$ |
|---|---|
| Room temperature | 1.06 |
| 105° C. | 0.546 |
| 200° C. | 0.680 |
| 300° C. | 0.908 |

These surface areas, disregarding the unusual behavior of a decrease and then an increase in surface area with increasing temperature, are of the same order of magnitude as those found for silver catalysts presently known. This supports my belief that the boron acts as a promoter, and it is the presence of boron, rather than any function of surface area, which is responsible for the remarkable improvement in cathodes produced according to my invention.

*Example IV*

The dried boron-doped silver powder, obtained from Example II was admixed with grade B carbonyl nickel powder. The proportions of nickel powder to boron-doped silver are varied so as to yield electrodes having from 25 to 300 mg./in.$^2$ of boron-doped silver on the superficial electrode surface.

This admixture of nickel powder and catalyst is thoroughly mixed until a homogeneous mixture is obtained. To this mixture is added sufficient Teflon 41–BX (E.I. du Pont's trademark for aqueous dispersion of polytetrafluoroethylene), to bind the particles of nickel and boron-doped silver catalyst.

Predetermined portions of this mixture were placed upon a nickel support screen and dried in a 100° C. oven to drive off the aqueous carrier for the Teflon.

After drying the articles were compressed by rolling to the thickness desired. The outputs of these electrodes in a hydrogen-oxygen fuel cell are recorded in Table I.

TABLE I

| | | | | | | | | | |
|---|---|---|---|---|---|---|---|---|---|
| Thickness, mils | 27 | 25 | 33 | 33 | 33 | 30 | 30 | 30 | 30 |
| Boron-doped silver, mg./in.$^2$ | 25 | 50 | 100 | 100 | 100 | 200 | 200 | 200 | 300 |
| Cell operating temp., °C | 70 | 70 | 70 | 80 | 90 | 70 | 80 | 90 | 70 |
| Open circuit | 0.18v | 0.13v | 0.07v | 0.07v | 0.07v | 0.10v | 0.12v | 0.13v | 0.09v |
| Amperes: | | | | | | | | | |
| 2.0 | 0.33 | 0.31 | 0.21 | 0.19 | 0.18 | 0.28 | 0.26 | 0.27 | 0.23 |
| 4.0 | 0.37 | 0.33 | 0.22 | 0.20 | 0.19 | 0.30 | 0.29 | 0.30 | 0.28 |
| 6.0 | 0.41 | 0.34 | 0.21 | 0.19 | 0.19 | 0.32 | 0.31 | 0.29 | 0.33 |
| 8.0 | 0.40 | 0.35 | 0.20 | 0.19 | 0.18 | 0.32 | 0.32 | 0.29 | 0.37 |
| 10.0 | 0.41 | 0.35 |  | 0.18 | 0.18 | 0.33 | 0.32 | 0.30 | 0.43 |

Table II further illustrates the outputs of 3 inch square cathodes of my invention made according to the method outlined in Example III compared to 3 inch square cathodes of porous nickel having 20 mg./in.$^2$ of platinum and 20 mg./in.$^2$ of palladium as the catalyst. The electrodes were tested in a hydrogen-oxygen fuel cell operated at 70° C., having the reactants supplied at a pressure of 9 pounds/in.$^2$ gauge, and having a 35% KOH electrolyte contained within an asbestos membrane.

TABLE II

| Cathode | Total IR free voltages at a current of— | | | | | Cathode voltages vs. standard hydrogen electrode at a current of— | | | | |
|---|---|---|---|---|---|---|---|---|---|---|
| | 2.0a | 4.0a | 6.0a | 8.0a | 10.0a | 2.0a | 4.0a | 6.0a | 8.0a | 10.0a |
| Boron-doped silver: | | | | | | | | | | |
| 50 mg./in.$^2$ | 0.856 | 0.808 | 0.772 | 0.738 | 0.71 | 0.045 | 0.108 | 0.157 | 0.202 | 0.238 |
| 100 m./m.$^2$ | 0.866 | 0.822 | 0.788 | 0.755 | 0.718 | 0.063 | 0.116 | 0.163 | 0.208 | 0.256 |
| Pt–Pd | 0.958 | 0.929 | 0.905 | 0.888 | 0.871 | 0.070 | 0.042 | 0.025 | 0.012 | −0.002 |

Immaterial variations of my invention will become apparent to those skilled in the art upon reading the foregoing specification and such variations, together with numerous other advantages will be understood not to constitute a departure from the underlying principle or idea of my invention within the scope of the appended claims.

Having now particularly described and ascertained the nature of my said invention and the manner in which it is to be performed, I declare that what I claim is:

1. A fuel cell comprising a housing, an electrolyte and a fuel electrode and an oxidant electrode, said oxidant electrode being a porous electrically conductive chemically inert substrate having a catalytically activating boron-doped silver applied thereto; said boron-doped silver comprising about 98 percent to less than 100 percent by weight silver and from greater than 0 percent to about 2 percent by weight boron.

2. A fuel cell according to claim 1 in which the electrode substrate has applied thereto 50 to 100 milligram of boron-doped silver per square inch of superficial electrode area.

3. A fuel cell according to claim 1 in which the electrode substrate is an electrically conductive materia selected from the group consisting of silver, nickel and carbon.

4. A fuel cell according to claim 3 in which the electrode substrate is comprised of a mixture of the electri cally conductive material and the boron-doped silve; said mixture being bonded by a resinous organic thermo plastic material.

5. An electrode for a fuel cell comprising a porou sheet of an electrically conductive chemically inert mate rial selected from the group consisting of silver, nicke and carbon having within the pores of said sheet a ca alytically activating boron-doped silver comprising abou 98 to less than 100 percent by weight silver and fro greater than 0 percent to about 2 percent by weight boro References Cited

UNITED STATES PATENTS

| 2,088,233 | 7/1937 | Colloseus | 136—121 |
| 2,605,300 | 7/1952 | Shirland | 136—121 |
| 2,669,598 | 2/1954 | Marko et al. | 136—12 |
| 3,196,050 | 7/1965 | Thompson | 136—12 |

FOREIGN PATENTS 925,182    5/1963    Great Britain.

WINSTON A. DOUGLAS, *Primary Examiner.*

N. P. BULLOCH, *Assistant Examiner.*